United States Patent
Harris et al.

(10) Patent No.: US 6,746,759 B2
(45) Date of Patent: Jun. 8, 2004

(54) CELLULAR PLASTIC MATERIAL BASED ON PHENOLIC RESIN

(75) Inventors: Mark Stanley Harris, Cheshire (GB); Vincent Coppock, Cheshire (GB); Norman Ryder, Derbyshire (GB); Graham Morgan Edgerley, Derbyshire (GB)

(73) Assignee: Kingspan Industrial Insulation Limited, Derbyshire (GB)

( * ) Notice: Subject to any disclaimer, the term of this patent is extended or adjusted under 35 U.S.C. 154(b) by 0 days.

(21) Appl. No.: 10/120,826

(22) Filed: Apr. 12, 2002

(65) Prior Publication Data

US 2002/0198268 A1 Dec. 26, 2002

Related U.S. Application Data

(63) Continuation of application No. PCT/EP00/09655, filed on Oct. 3, 2000.

(30) Foreign Application Priority Data

Oct. 20, 1999 (WO) ............................... PCT/EP99/08138

(51) Int. Cl.[7] .................................................. C08J 9/24
(52) U.S. Cl. ...................... 428/304.4; 428/70; 428/71; 521/57; 521/69; 521/70; 521/72
(58) Field of Search .................... 428/70, 71, 304.4; 521/57, 69, 70, 72, 135, 136, 181, 178

(56) References Cited

U.S. PATENT DOCUMENTS

| 3,599,433 A | | 8/1971 | Murata et al. .................. 61/36 |
| 3,696,622 A | | 10/1972 | Tohma et al. .................. 61/36 |
| 4,252,908 A | | 2/1981 | Paladini ...................... 521/117 |
| 4,798,848 A | * | 1/1989 | Diethelm |
| 5,405,881 A | * | 4/1995 | Schneider et al. |
| 6,610,754 B1 | * | 8/2003 | Rader |

FOREIGN PATENT DOCUMENTS

| DE | 3329334 A1 | 2/1985 |
| EP | 0085512 A1 | 8/1983 |
| EP | 0146499 A2 | 6/1985 |
| EP | 0166275 A2 | 1/1986 |
| GB | 2140017 A | 11/1984 |
| JP | 50-130627 | 10/1975 |
| JP | 01092242 | 4/1989 |
| JP | 4268323 | 9/1992 |
| JP | 04364908 | 12/1992 |
| WO | WO94/11132 | 5/1994 |

OTHER PUBLICATIONS

Japanese Abstract Pub. No. 11255939 Pub. date Sep. 29, 1999.*

* cited by examiner

*Primary Examiner*—Morton Foelak
(74) *Attorney, Agent, or Firm*—Jacobson Holman PLLC

(57) ABSTRACT

A resin mixture for forming a stable closed cell foam contains a phenolic resole, a chain extending agent, and as curing agents, a base, and an ester and/or an aliphatic carbonate. The chain extending agent is especially an epoxy resin and/or a phenolic novalak resin.

35 Claims, No Drawings

CELLULAR PLASTIC MATERIAL BASED ON PHENOLIC RESIN

This is a continuation of PCT/EP00/09655, filed Oct. 3, 2000 and published in English.

The invention relates to cellular plastic materials.

INTRODUCTION

There are several classes of thermosetting resin system that could be considered as possible candidate materials for the production of fire resistant low-density cellular insulation foam when compounded with appropriate additives. However, the required flammability performance restricts selection of many types of organic thermosetting resin. For instance, halogen atoms would need to be incorporated into the chemical backbone of unsaturated polyester resins and epoxy resins to impart self-extinguishing behaviour. Alternatively, unsaturated polyester resins and epoxy resins would need to be blended with halogenated compounds to impart self-extinguishing behaviour. Such chemical compositions would generate toxic gases such as hydrogen chloride or hydrogen bromide in a fire situation. Addition of other types of non-halogenated flame-retardant such as organo-phosphorous compounds can give rise to high smoke emission in a fire situation. The addition of a flame-retardant compound may also have an adverse effect on cellular plastic mechanical strength. Other, thermosetting resins such as polyurethane and polyisocyanurate resins produce high smoke and toxic gas emissions in a fire situation Polyurethane may not be self-extinguishing in a fire situation. Hence these materials cannot be the materials of choice if fire performance is a concern.

Historically, phenolic resins have been the preferred thermosetting plastic material when low smoke emission and self-extinguishing ability are of paramount importance in a particular application.

Presently, in cellular foam manufacture, a phenolic resole resin is commonly catalysed by either a strong organic or inorganic acid. For example DE3329334 A describes a process for the production of an acid cured phenol resin foam in which the acids are premixed with novalak resin before addition of a phenolic resole. The selection of acid type is dependent on the desired curing time and temperature. Cellular insulation foam is produced when the blowing agent that has been pre-blended into the resin, starts to boil. Halocarbons are commonly used blowing agents. Expansion typically occurs in the temperature range 25° C. to 80° C. In thick sections of acid cured phenolic foam, it is possible that a resin exotherm will develop. The occurrence of an uncontrolled exothermic chemical reaction is more likely when a strong acid is used as catalyst. When exothermic reactions develop, large amounts of water or steam are created by the phenolic resins condensation polymerisation reaction. The consequential shrinkage of the resin matrix can adversely affect the ability to form a closed cell foam structure as well as impairing the mechanical strength performance. Closed cell foam structure is highly desirable to maximise insulation performance.

As conventional phenolic foam is produced using an acid catalyst, there has been concern that when this foam is in direct contact with metal, such as an insulated pipe, it could induce corrosion of the metal. Hence there is a desire for a foam insulation product that has the mechanical strength and fire performance of an acid catalysed phenolic foam, yet is pH neutral or moderately basic. Such a material would alleviate the risk of induced acidic corrosion.

EP-A-0166275 describes a resin composition for a molding material used particularly for electrically insulating laminated plates. The resin comprises a resole phenolic resin, an epoxy resin and a strength enhancing amine compound.

It is well known that alkaline phenol formaldehyde resole resins can be cured by aliphatic esters to produce a chemical binder for foundry sand moulds and cores as described in JP-A-130627/1975 and EP-A-O 085 512. Also, U.S. Pat. No. 3,599,433 and U.S. Pat. No. 3,696,622 discuss alkaline phenol formaldehyde resole resins reacting with a lactone as a method for soil stabilisation and leakage prevention. It has been documented in EP-A-0146499, JP-A-S62-250267, JP-A-04364908 and JP 01092242A that acid free phenolic cellular plastic can be produced by curing an alkaline phenol formaldehyde resin with various aliphatic esters.

Other commercial applications using alkaline phenol formaldehyde resins cured by aliphatic esters such as lactones have been limited due to the inherent high shrinkage of the cured phenolic resin.

There is a need for a stable cellular plastic foam that has good mechanical strength and fire performance.

STATEMENTS OF INVENTION

According to the invention there is provided a resin mixture for forming a cellular plastic foam, the resin mixture containing a phenolic resole, a chain extending agent, and as curing agents, a base, and an ester and/or an aliphatic carbonate.

In one embodiment the chain-extending agent is an epoxy resin.

In another embodiment the chain-extending agent is a thermoplastic modifier.

In a particularly preferred embodiment the chain extending agent includes an epoxy resin and a thermoplastic modifier.

Preferably the thermoplastic modifier is a phenolic novalak resin.

Preferably the phenolic novalak has a number average molecular weight between 1000 and 1500.

Preferably the phenolic novalak is present in an amount from 2% to 30% by weight. Most preferably in an amount from 14 to 25% by weight.

In one embodiment of the invention the resin mixture has a pH of at least 9.

In one embodiment the epoxy is present in an amount from 2% to 30% by weight.

Preferably the epoxy resin contains at least two epoxy groups in the molecule.

The epoxy is preferably based on oligomers of diglycidylether of Bisphenol A or diglycidylether of Bisphenol F or mixtures thereof.

Preferably the phenolic resole has a reactive solids content in the range of from 50% to 85% by weight.

In one embodiment the phenolic resole is prepared from an optionally substituted phenol and an aldehyde in the molar ratio of phenol to aldehyde of 1:1 to 1:3.0

Typically the base is potassium hydroxide and/or sodium hydroxide.

Preferably the ester is a lactone. Ideally the ester is selected from one or more of γ-butyrolactone and caprolactone.

Preferably the ester is present in an amount of from 2 to 25% by weight.

In one embodiment the resin mixture includes a blowing agent. The blowing agent may be a liquid and/or a gas.

Preferably the blowing agent has a boiling point of up to 70° C.

In a preferred embodiment the blowing agent is present in the resin mixture in an amount of up to 25% by weight.

Preferably the blowing agent is a halogenated hydrocarbon, especially pentafluorobutane and/or 1,2 dichloro-1-fluoroethane and/or pentane or mixtures thereof.

In one embodiment the resin mixture includes a surfactant, especially a non-ionic surfactant.

The surfactant may be a dimethylsiloxane/polyoxyalkylene copolymer.

Preferably the surfactant is present in an amount of from 1 to 15% by weight. The invention also provides a process for the preparation of a cellular plastic by expanding and curing a resin mixture of the invention.

In one embodiment the cellular plastic is manufactured at atmospheric pressure.

Alternatively the cellular plastic is manufactured at a pressure less than atmospheric pressure.

In another embodiment the cellular plastic is manufactured at a pressure greater than atmospheric pressure.

The invention further provides a cellular plastic whenever manufactured using a resin mixture of the invention and/or using a process of the invention.

Preferably the cellular plastic has a thermal conductivity of less than 0.04 W/mK, most preferably less than 0.025 W/mK.

Preferably the cellular plastic for insulation has a substantially closed cell structure, ideally having a closed cell content of greater than 90%. Most preferably this closed cell structure is stable over an extended period of time at room temperature.

DETAILED DESCRIPTION

The materials described herein relate to formulated phenolic resin compositions. These compositions can be used to manufacture closed cell insulation foam that is self-extinguishing in a fire situation. Also this cellular insulation foam generates low smoke emission. The cellular insulation foam material described herein satisfies the mechanical strength criteria and non-burning specification requirements for use in various insulation applications. The thermal and sound insulation of buildings and transport are areas of application for such products as are the lagging of pipe sections.

The cellular insulation foam materials of the present invention can be manufactured at temperatures between 10° C. and 90° C. under either atmospheric pressure or partial vacuum.

The present invention relates to fire resistant cellular foam insulation produced from a two part acid free modified Phenolic resin system. This resin system cures with minimal shrinkage and has a high proportion of closed foam cells. Open cell foams may also be produced in this way however closed cell foams maximise thermal insulation performance as measured by thermal conductivity. Thermal conductivity is tested by BS 4370. The chemical composition of the resin system for foam manufacture of the present invention comprises the following. An alkaline phenol formaldehyde resole resin, an aliphatic ester and/or aliphatic carbonate, a blowing agent and surfactant. Chain-extending agents such as thermoplastic phenolic novalak resin and/or epoxy resin are also key components of the present chemical composition. In particular enhanced insulation performance was achieved by creating a stable closed cell foam.

The presence of thermoplastic phenolic novalak resins in the chemical composition could also serve to enhance the toughness of the cured phenolic foam. The phenolic novalak resin selected may be pre-dissolved or pre-dispersed to a limited degree as a micronised powder in either the uncured alkaline phenolic resole resin, the epoxy resin or in the aliphatic ester/aliphatic carbonate.

The epoxy resin selected can be pre-dissolved in phenolic resole resin, aliphatic ester/aliphatic carbonate, blowing agent or combinations thereof.

A feature of the invention is that the phenolic novalak used can react with both the epoxy resin and the phenolic resole to create a complex cured phenolic-epoxy copolymer. In the chemical composition on which the invention is based, a catalyst such as triphenyl phosphine, (TPP), is optionally included in appropriate proportions to promote the chemical reaction between phenolic novalak and epoxy resin at 30–80° C. It is believed that the presence of an alkali such as potassium hydroxide, plus an aliphatic ester such as caprolactone or butyrolactone will promote polymerisation of the phenolic resole resin. When phenolic novalak is also present in the said chemical composition, the alkali and aliphatic ester will also assist in promoting a chemical reaction between phenolic resole and phenolic novalak. When caprolactone is selected as the ester in the chemical composition, it is believed that the presence of an alkali could also promote formation of polycaprolactone as a side reaction. The presence of polycaprolactone will act as a toughening agent enabling the cellular plastic to be less brittle.

The inclusion of a controlled amount of epoxy resin does not significantly detract from the favourable fire performance associated with phenolic resins alone. It is also possible to include in the chemical composition of the invention the option of a catalyst that will promote only epoxy homopolymerisation. For instance 2-ethyl 4-methyl imidazole. Such a catalyst can be used to optimise insulation foam manufacturing time. It may also ensure that no unreacted epoxy chemical groups remain.

The material system of the present invention can also optionally comprise appropriate additives. For instance, flame retardants, fillers, reinforcing materials, coupling agents, pH adjusting agents, elastomeric or thermoplastic toughening agents, plasticisers and dyes. These additives serve to optimise either or both the uncured and the cured physical properties of the material composition.

Blowing agents can include but are not limited to fluorinated and or chlorinated hydrocarbons, alcohols, ketones and alkanes. Preferred, are blowing agents such as pentafluorobutane and 1,2 dichloro-1 1 fluoroethane and pentane. To the chemical composition, which is the basis of the invention, is added up to 25% by weight of blowing agent, more typical is the range 2 to 10% by weight to achieve the desired foam density. (15–125 kg/m3). The amount of blowing agent can be varied to suit the desired final density of the cellular insulation foam.

For cellular insulation foam manufacture, surfactants are also present in the chemical composition. Non-ionic siloxane-oxyalkylene, oxyalkylated castor oil and polyoxyalkylated alkyl phenols have been used successfully as surfactants both individually and in combination. For the chemical composition which is the basis of the invention it is preferred that between 1 and 15% surfactant is employed. More preferable is the range 2 to 6% by weight.

EP-A-0146499 describes examples of suitable phenolic resole type resins that can also be used in the present invention. These also include but are not restricted to phenolic resole resins based on substituted phenols such as m cresol, 3,5-xylenol resorcinol and mixtures thereof.

It has been found that the selection of a resole with higher molecular weight can improve mechanical strength of the final cellular insulation foam produced.

A phenolic resole resin with a percentage cured reaction solids of 60–85%, and more preferably 70–80% solids, is mixed with an alkali such as potassium hydroxide to give a hydroxyl anion content in the range 0.5%–10% more preferably 1%–3.5%. Therefore in the total composition of the present invention, it is possible for up to 60% by weight of phenolic resole to be employed. More preferably the total phenolic resole content is 25 to 45% by weight.

Phenolic resole solids content is determined using a 4 g sample of phenolic resole resin, subjecting it to 140° C. for one hour and recording residual weight. Hydroxyl anion content can be determined by titration with a molar standard solution of dilute acid.

EP-A-0146499 describes examples of aliphatic esters and aliphatic carbonates that can be used in the present invention. These include, but are not restricted to, γ butyrolactone, caprolactone, valerolactone, propiolactone, glycerol triacetate, glycerol diacetate, glycerol monoacetate, methyl formate, ethyl formate and ethylene glycol diacetate, ethylene carbonate, and propylene carbonate. Most preferred are γ butyrolactone and caprolactone. These organic esters can be used individually or in combination to regulate reactivity. For the chemical composition which is the basis of the invention it is preferred that between 2 and 25% by weight ester is employed. More preferable is the range 6 to 13% by weight.

Commercially available phenolic novalak resins are part of the chemical composition that is the basis of the current invention. Phenolic novalak resins are thermoplastic materials whose aromatic rings can be linked in either the ortho, meta or para ring positions. For use in the present invention, the phenolic novalak selected should have a number average molecular weight of 1000–1500.

Similarly ortho, meta or para novalak phenolic resins with pendant chemical substituents such as cresols, can also be considered to be within the scope of the present invention. Similarly ortho, meta or para linked novalak phenolic resins modified by nitrile rubber can also be considered to be within the scope of the present invention. Phenolic novalak resins based on aldehydes other than formaldehyde, such as furfural, can also be considered to be within the scope of the present invention. For the chemical composition which is the basis of the invention it is preferred that between 2 and 30% by weight phenolic novalak is employed. More preferable is the range 14 to 25% by weight.

Before combining an alkaline phenol formaldehyde resole type resin with a suitable aliphatic ester, it is preferable to predissolve some or all of the modifying phenolic novalak in either the alkaline phenol formaldehyde resole resin or the aliphatic ester. Generally it is preferred that the aliphatic ester selected can predissolve some or all the required amount of phenolic novalak.

Commercially available epoxy resins are part of the chemical composition that is the basis of the current invention. The epoxide compounds which can be used herein include but are not limited to epoxy resins obtained by reacting Bisphenol A, tetrabromobisphenol A, Bisphenol F, resorcinol, phenolic novalak, methylene dianiline, para amino phenol or polyalkylene glycol with epichlorohydrin. Particularly favoured are commercially available liquid epoxy resins Epikote 862 and 828 from the Shell Company. For the chemical composition which is the basis of the invention it is preferred that between 2 and 30% epoxy resin is employed. More preferable is the range 10 to 20% by weight.

As well as conventionally manufacturing cellular insulation foam in the temperature range 40–90° C. depending on the selected blowing agent and resin reactivity, it is a feature of the invention that foam can be manufactured under reduced pressure at ambient temperature. When an appropriate vacuum is applied, the blowing agent will begin to boil. After the resin system has cured sufficiently, the vacuum is removed leaving cellular insulation foam. (Example 4 describes such a procedure). Using a vacuum manufacturing method for cellular foam manufacture is not easily achievable with strong acid catalysed phenolic foam, as the exothermic chemical reaction cannot be readily controlled particularly in large sections. It will also be appreciated that cellular foam could be manufactured by introducing gas under pressure, into the combined 2 part resin system at an appropriate temperature, for instance, carbon dioxide.

Procedures for applying the material compositions of the invention to the manufacture of low-density cellular foam are described below. The chemical compositions on which the invention is based are two-part resin systems of modified phenolic resin that have been cured by base and ester. The mixing of chemical components described herein to produce foam is achieved by using either a standard mechanical mixing head, a static mixer, or by high pressure impingement mixing of two component streams. All these mixing techniques are well known in polyurethane or phenolic foam manufacture.

The chemical compositions can be cured at temperatures between 10 and 90° C. under atmospheric pressure, most preferably, between 50 and 70° C. under atmospheric pressure. Alternatively, the chemical compositions on which the invention is based can also be adapted to cure under partial vacuum between 15 and 50° C. Most preferably between 18 and 35° C. The insulation foam produced by either manufacturing technique is non acidic.

Example 1 describes a chemical composition on which the invention is based. By comparing Examples 1 and 2, it is demonstrated that insulation foam based on a novalak modified epoxy-phenolic copolymer that has been cured by an alkali and an ester, has a stable lower thermal conductivity compared to phenolic resole cellular foam cured by alkali and ester without such epoxy and novalak modification. Similarly, the former cellular foam demonstrates much higher compressive strength over the latter.

If an alternative fire resistant thermoplastic such as polyethersulphone, (PES), is selected in place of phenolic novalak, inferior insulation performance is observed. This may be due to the fact that PES probably does not chemically react into the polymer backbone in the typical temperature range used to manufacture insulation foam. By comparing Examples 1 and 3, it is demonstrated that insulation foam based on a novalak modified epoxy-phenolic copolymer that has been cured by base and ester, has a stable lower thermal conductivity value compared to an epoxy-phenolic cellular foam cured by base and ester and modified by PES.

Example 4 describes the preparation of a novalak modified epoxy-phenolic copolymer at 20° C. under vacuum.

Cellular foam based on the chemical composition of the present invention maintains the fire self extinguishing and low smoke behaviour associated with conventional acid cured phenolic insulation foam.

EXAMPLES

In all the examples below, the phenolic resole has a cured solids content of 78% and a viscosity of 4500 cp at 25° C. The pH range is typically 7 to 9. It is commercially available as TH276 from Fers S. A.

In all the examples below, the phenolic novalak has a % free phenol level below 1%. On a weight basis, 98% is below 75 microns particle size. Number average molecular weight is 1000–1500 by Gel Permeation Chromatography (GPC) It is commercially available as FB8112SH from Fers S. A.

See Table 1 for a summary of chemical compositions investigated.

Example 1
Preparation of a Cellular Foam Material at 60° C. Based on a Novalak Modified Epoxy Phenolic Resole Resin Cured by Ester and Base Part "A" Resin Preparation 23.9 parts by weight of phenolic novalak are dissolved in 19.7 parts of caprolactone and 3.75 parts of butyrolactone at 70–90° C. and cooled to below 50° C. Next, 33.1 parts by weight of Epikote 862 epoxy resin (sourced from Shell Co) are added and the mixed resin is immediately cooled to room temperature. 5 parts by weight of surfactant, DABCO 193, (from Air Products) is added and stirred. Then 2.5 parts by weight of surfactant Ethylan C40H (from Akcros) is added and mixed until homogenous. After this, 7 parts by weight of phenolic novalak micronised powder is dispersed into "Part A" using a high shear mixer. Part "A" is allowed to cool again to room temperature.

Then 17 parts by weight of the low boiling point blowing agent, "141b" (Solvay) is stirred into Part "A" to give the final uniform resin mixture.

Part "B" Resin Preparation

To 80 parts by weight of Phenolic resole resin (TH276), is dispersed by shear 7 parts by weight of micronised phenolic novalak powder. Then 32 parts by weight of 50% aqueous potassium hydroxide solution are added. The resin mix is then immediately cooled to room temperature Part "B" is then held at room temperature in readiness for mixing with Part "A".

Production of Cellular Foam Based on Example 1

111.95 parts by weight of Part "A" are mixed quickly together with 119 parts by weight of Part "B" at 20° C. The two-part mix is intimately mixed for 30 seconds. It is then immediately poured into a mould at 40° C. and placed in a preheated oven at 60° C. for 12 hours. Foaming occurs.

Properties of Cellular Foam Based on Example 1

A final cured foam density of 47 kg/m$^3$ was achieved.

After 24 hours standing at 20° C., a flat section of the foam was placed horizontally above an intense blue Bunsen flame of height 50 mm and burnt for 60 seconds. Upon removal of the flame, self-extinguishing immediately occurred. There was very low smoke emission during or after burning. No punking was observed. After immersing the foam in water at 20° C. for 2 weeks, the pH of the water is 7. Such a foam would be expected to be non corrosive if used as insulation around metallic pipes.

The initial measured thermal conductivity of the foam is 0.0198 W/mK. This result indicates the foam has a high closed cell content to maximise insulation performance. The closed cell content was measured as 98%. To simulate long term ageing at ambient temperature, the foam was conditioned at 70° C. for 64 days. The thermal conductivity of the foam is 0.0208 W/m/K.

The compressive strength of the foam produced is 145 kN/m$^2$, which is comparable to conventional acid cured phenolic foam of the same density. (Tested parallel to the foam rise direction).

Example 2—Comparative Example
Preparation of a Cellular Foam Material at 60° C. based on a Phenolic Resole Resin Cured by Ester and Base Part "A" Resin Preparation To 19.7 parts of caprolactone and 3.75 parts of butyrolactone at 20° C. is added 2.5 parts by weight of Ethylan C40AH surfactant and mixed until homogenous. Next, 7.5 parts by weight of surfactant, DABCO 193 is added and stirred. 17 parts by weight of the blowing agent, "141b" is added to give the final Part "A" uniform resin mixture. Part "A" is maintained at room temperature.

Part "B" Resin Preparation

To 80 parts by weight of phenolic resole resin is added 32 parts by weight of 50% aqueous potassium hydroxide solution. The resin mix is then immediately cooled to room temperature.

Part "B" is then held at room temperature in readiness for mixing with Part "A".

Production of Cellular Foam Based on Example 2

47.9 parts by weight of Part "A" are mixed quickly together with 112 parts by weight of Part "B" at 20° C. This two-part mix is intimately mixed for 30 seconds. It is then immediately poured into a mould at 40° C. and placed in a preheated oven at 60° C. for 12 hours. Foaming occurs.

Properties of Cellular Foam Based on Example 2

A final cured foam density of 48 kg/m$^3$ is achieved.

After 24 hours standing at 20° C. a flat section of the foam was placed horizontally above an intense blue Bunsen flame of height 50 mm and burnt for 60 seconds. Upon removal of the flame, self-extinguishing immediately occurs. There is very low smoke emission during or after flame application. Punking is observed. After immersing the foam in water at 20° C. for 2 weeks, the pH of the water is 7. Such a foam would be expected to be non corrosive if used as insulation around metallic pipes.

Initially, at 20° C. the measured thermal conductivity of the foam is 0.055 W/mK. The compressive strength of the foam produced could not be measured as the foam produced was too soft.

Example 3
Preparation of a Cellular Foam Material at 60° C. Based on a Polyethersulphone (PES) Modified Epoxy Phenolic Resole Resin Cured by Ester and Base Part "A" Resin Preparation 8 parts by weight of polyethersulphone, Grade E2020 from BASF, is dissolved in 19.7 parts by weight of caprolactone and 3.75 parts of butyrolactone by weight at 70–90° C. Then, 33.1 parts by weight of Epikote 862 epoxy resin are added and the resin mix is immediately cooled to room temperature. Then 5 parts by weight of surfactant, DABCO 193 is added and stirred followed by 2.5 parts of Ethylan C40AH.

Next, 17 parts by weight of the blowing agent "141b" are stirred into Part "A" to give the final uniform resin mixture.

Part "B" Resin Preparation

To 80 parts by weight of phenolic resole resin, are added 32 parts by weight of 50% aqueous potassium hydroxide solution.

Part "B" is then held at room temperature in readiness for mixing with Part "A".

Production of Cellular Foam Based on Example 3

89.05 parts by weight of Part "A" are mixed quickly together with 112 parts by weight of part "B" at 20° C. The two-part mix is intimately mixed for 30 seconds. It is then immediately poured into a mould at 40° C. and placed in a preheated oven at 60° C. for 12 hours. Foaming occurs.

Properties of Cellular Foam Based on Example 3

A final cured foam density of 53 kg/m$^3$ is achieved. After 24 hours standing at 20° C., a flat section of the foam was placed horizontally above an intense blue Bunsen flame of height 50 mm and burnt for 60 seconds. Upon removal of the flame, self-extinguishing immediately occurs. There is very low smoke emission during or after flame application.

After immersing the foam in water at 20° C. for 2 weeks, the pH of the water is 7. Such a foam would be expected to be non corrosive if used as insulation around metallic pipes.

After 12 hours, at 20° C., the measured thermal conductivity of the foam is 0.035 W/mK.

Example 4
Preparation of a Cellular Foam Material Based on a Novalak Modified Epoxy Phenolic Resole Resin at 20° C. under vacuum.

Part "A" Resin Preparation 23.9 parts by weight of phenolic novalak are dissolved in 11.9 parts of butyrolactone, 11.9 parts of caprolactone and 17.3 parts of DER332 epoxy (from Dow Chemicals) at 70–90° C.

Then, 17.2 parts by weight of DEN438 epoxy resin (from Dow Chemicals) is added and dissolved in at 70–90° C.

The resin mix is immediately cooled to room temperature. Next, 7.1 parts by weight of a surfactant, DABCO 193 is added and stirred. This is then followed by 2.2 parts by weight of epoxy catalyst such 2 Ethyl 4 Methyl Imidazole.

To try to promote chemical reaction between the epoxy resin and phenolic novalak, triphenyl phosphine (TPP) catalyst is used. For convenience, 1.4 parts by weight of triphenyl phosphine catalyst are predissolved in 22 parts by weight of the low boiling point blowing agent, "141b". Then 23.4 parts by weight of the combined 141 b/TPP blend are stirred into Part "A" to give the final uniform resin mixture.

Part "B" Resin Preparation

To 40 parts by weight of phenolic resole resin, is added 13.1 parts by weight of 50% aqueous potassium hydroxide solution. This alkaline phenolic resole resin mixture is heated 60–72° C. and held at this temperature until a 25° C. resin viscosity of 40,000–60,000 cp. is achieved. The resin mix is then immediately cooled to room temperature and a further 19.6 parts by weight of 50% aqueous potassium hydroxide solution are added.

Part "B" is then held at room temperature in readiness for mixing with Part "A".

Production of Cellular Foam Based on Example 4

153.9 parts by weight of Part "A" are mixed quickly together with 72.7 parts by weight of Part "B" at 20° C. The two-part mix is intimately mixed for 30 seconds. It is then immediately poured into a mould at 20° C. and placed in a vacuum vessel at 20° C. A partial vacuum of 450 mb (16.2 in Hg vac) is rapidly applied and maintained for 3 hours. Foaming immediately occurs. After removal of the vacuum, the block of foam produced is allowed to build up its strength for 1 week before testing.

Properties of Cellular Foam Based on Example 4

A final cured foam density of 39 kg/m$^3$ is achieved.

After 24 hours standing at 20° C. a flat section of the foam was placed horizontally above an intense blue Bunsen flame of height 50 mm and burnt for 60 seconds. Upon removal of the flame, self-extinguishing immediately occurs. There is very low smoke emission during or after burning.

After 1 week of ageing at room temperature, the foam is immersed in water at 20° C. for 2 weeks. The final pH of the water is neutral. Such a foam would be expected to be non corrosive if used as insulation around metallic pipes.

The invention is not limited to the embodiments hereinbefore described which may be varied in detail.

Appendix 1

TABLE 1

|  | Example 1 | Example 2 | Example 3 | Example 4 |
|---|---|---|---|---|
| Part A |  |  |  |  |
| Novalak (1) | 23.9 | 0 | 0 | 23.9 |
| Caprolactone | 19.7 | 19.7 | 19.7 | 11.9 |
| Butyrolactone | 3.75 | 3.75 | 3.75 | 11.9 |
| Polyethersulphone E2020 | 0 | 0 | 8 | 0 |
| Epikote 862 Epoxy | 33.1 | 0 | 33.1 | 0 |
| DER 332 Epoxy | 0 | 0 | 0 | 17.3 |
| DEN 438 Epoxy | 0 | 0 | 0 | 17.2 |
| Surfactant DC193 | 5 | 5 | 5 | 7.1 |
| Ethylan C40AH | 2.5 | 2.5 | 2.5 | 0 |
| 2 Ethyl 4 Methyl Imidazole | 0 | 0 | 0 | 2.2 |
| Novalak (2) | 7 | 0 | 0 | 0 |
| Triphenyl Phosphine | 0 | 0 | 0 | 1.4 |
| 1,1 Dichloro-1-fluoroethane | 17 | 17 | 17 | 22 |
|  | 111.95 | 47.95 | 89.05 | 114.9 |
| Part B |  |  |  |  |
| Phenolic Resole | 80 | 80 | 80 | 80 |
| 50% Potassium Hydroxide | 32 | 32 | 32 | 32 |
| Novalak | 7 | 0 | 0 | 0 |
|  | 119 | 112 | 112 | 112 |

What is claimed is:

1. A resin mixture for forming a cellular plastic foam, the resin mixture comprising a phenolic resole, an epoxy resin, a phenolic novalak resin, and as curing agents, a base, and an ester and/or an aliphatic carbonate.

2. The resin mixture as claimed in claim 1 wherein the phenolic novalak has a number average molecular weight of 1000–1500.

3. The resin mixture as claimed in claim 1 wherein the phenolic novalak is present in an amount of from 2% to 30% by weight.

4. The resin mixture as claimed in claim 1 wherein the phenolic novalak is present in an amount of from 14 to 25% by weight.

5. The resin mixture as claimed in claim 1 having an initial pH of at least 9.

6. The resin mixture as claimed in claim 1 wherein the epoxy is present in an amount of from 2 to 30%.

7. The resin mixture as claimed in claim 1 wherein the epoxy is present in an amount of from 10 to 20% by weight.

8. The resin mixture as claimed in claim 1 wherein the epoxy resin contains at least two epoxy groups in the molecule.

9. The resin mixture as claimed in claim 1 wherein the epoxy is based on oligomers of diglycidylether of Bisphenol A or diglycidylether of Bisphenol F or mixtures thereof.

10. The resin mixture as claimed in claim 1 wherein the phenolic resole has a reactive solids content in the range of from 50%–85% by weight.

11. The resin mixture as claimed in claim 1 wherein the phenolic resole is prepared from an optionally substituted phenol and an aldehyde in a molar ratio of phenol to aldehyde of 1:1 to 1:3.0.

12. The resin mixture as claimed in claim 1 wherein the base is potassium hydroxide and/or sodium hydroxide.

13. The resin mixture as claimed in claim 1 wherein the ester is a lactone.

14. The resin mixture as claimed in claim 1 wherein the ester is selected from one or more of y-butyrolactone and caprolactone.

15. The resin mixture as claimed in claim 1 wherein the ester is present in an amount of from 2 to 25% by weight.

16. The resin mixture as claimed in claim 1 including a blowing agent.

17. The resin mixture as claimed in claim 16 wherein the blowing agent is a liquid and/or a gas.

18. The resin mixture as claimed in claim 17 wherein the blowing agent has a boiling point of up to 70° C.

19. The resin mixture as claimed in claim 16 wherein the blowing agent is present in the resin mixture in an amount of up to 25% by weight.

20. The resin mixture as claimed in claim 16 wherein the blowing agent is a halogenated hydrocarbon.

21. The resin mixture as claimed in claim 16 wherein the blowing agent is pentafluorobutane and/or 1, 2 dichloro-1-fluoroethane and/or pentane or mixtures thereof.

22. The resin mixture as claimed in claim 1 including a surfactant.

23. The resin mixture as claimed in claim 22 wherein the surfactant is non-ionic.

24. The resin mixture as claimed in claim 22 wherein the surfactant is a dimethylsiloxane/polyoxyalkylene copolymer.

25. The resin mixture as claimed in claim 22 wherein the surfactant is present in an amount of from 1 to 15% by weight.

26. A resin mixture for forming a stable closed cell foam, the resin mixture comprising a phenolic resole, an epoxy resin, a phenolic novalak resin, and as curing agents, a base, and an ester and/or an aliphatic carbonate.

27. The process for the preparation of a cellular plastic by expanding and curing a resin mixture as claimed in claim 1.

28. The process as claimed in claim 27 wherein the cellular plastic is manufactured at atmospheric pressure.

29. The process as claimed in claim 28 wherein the cellular plastic is manufactured at a pressure less than atmospheric pressure.

30. The process as claimed in claim 29 wherein the cellular plastic is manufactured at a pressure greater than atmospheric pressure.

31. The cellular plastic whenever manufactured using a resin mixture as claimed in claim 1.

32. The cellular plastic as claimed in claim 31 having a thermal conductivity of less than 0.04 W/mK.

33. The cellular plastic as claimed in claim 31 having a thermal conductivity of less than 0.025 W/mK.

34. The cellular plastic as claimed in claim 31 of substantially closed cell structure.

35. The cellular plastic as claimed in claim 31 having a closed cell content of greater than 90%.

* * * * *